United States Patent [19]

Brunelle

[11] Patent Number: 5,908,915
[45] Date of Patent: Jun. 1, 1999

[54] COPOLYETHERIMIDES AND PHASE CATALYZED METHOD FOR THEIR PREPARATION

[75] Inventor: Daniel Joseph Brunelle, Burnt Hills, N.Y.

[73] Assignee: General Electric Company, Schenectady, N.Y.

[21] Appl. No.: 08/944,276

[22] Filed: Oct. 6, 1997

[51] Int. Cl.$^6$ .............. C08G 8/02; C08G 73/00; C08G 69/26; C08G 75/00
[52] U.S. Cl. .............. 528/170; 528/125; 528/26; 528/126; 528/128; 528/171; 528/172; 528/173; 528/174; 528/175; 528/179; 528/182; 528/185; 528/188; 528/214; 528/215; 528/219; 528/220; 528/229; 528/350; 528/351; 528/352; 528/353
[58] Field of Search .............. 528/26, 125, 126, 528/128, 170, 171, 172, 173, 174, 175, 179, 185, 182, 214, 215, 219, 220, 350, 353, 188, 351, 352, 229

[56] References Cited

U.S. PATENT DOCUMENTS 5,229,482  7/1993  Brunelle .................... 528/125

Primary Examiner—P. Hampton-Hightower
Attorney, Agent, or Firm—Noreen C. Johnson; Douglas E. Stoner

[57] ABSTRACT

Copolyetherimides are prepared by the reaction of an alkali metal salt of a dihydroxyaromatic compound with a bis (substituted phthalimide) and a third compound which may be a substituted aromatic ketone or sulfone or a macrocyclic polycarbonate or polyarylate oligomer. The reaction takes place the in presence of a solvent and a phase transfer catalyst having high thermal stability, such as a hexaalkylguanidinium halide. Random or block copolymers may be obtained, depending on the reaction conditions.

21 Claims, No Drawings

COPOLYETHERIMIDES AND PHASE CATALYZED METHOD FOR THEIR PREPARATION

BACKGROUND OF THE INVENTION

This invention relates to novel aromatic copolyetherimides and a method for their preparation by a phase transfer catalyzed reaction.

Various types of aromatic polyethers, particularly polyethersulfones and polyetherketones, have become important as engineering resins by reason of their excellent properties. These polymers are typically prepared by the reaction of salts of dihydroxyaromatic compounds, such as bisphenol A disodium salt, with dihaloaromatic molecules such as bis(4-fluorophenyl) sulfone, bis(4-chlorophenyl) sulfone and the analogous ketones.

These reactions previously required the use of dipolar aprotic solvents, which were necessary to solubilize one or both reactants. Such solvents are expensive, difficult to purify and difficult to keep dry, since they readily dissolve water. Moreover, the polymers prepared by the use of such solvents are frequently colored by reason of the occurrence of side reactions leading to colored by-products.

Another class of polymers capable of preparation by a similar method is the polyetherimides. U.S. Pat. Nos. 3,787,364, 3,838,097 and 3,847,869 describe their preparation by the reaction of salts such as bisphenol A disodium salt with halo- or nitro-substituted bis(phthalimido) derivatives of aromatic diamines. These methods of preparation also require dipolar aprotic solvents. In addition, they frequently do not afford products of high molecular weight or in high yield. As a result, polyetherimides are normally produced on a commercial scale by the reaction of diamines with bis (ether anhydrides). The latter reagents are generally themselves produced by a complex multi-step synthetic method often employing nitro-substituted phthalimides, which lead to the formation of by-products hazardous to the environment in varying degrees.

There has been considerable attention directed in recent years to methods for conducting organic reactions in heterogeneous systems, employing a phase transfer catalyst which facilitates migration of a reactant into a phase from which it is normally absent. Thus, for example, it is known that bis(ether anhydrides) may be prepared by the reaction of a bisphenol disodium salt with a nitro- or halo-substituted phthalimide in a methylene chloride-water mixture, employing a phase transfer catalyst to promote migration of the otherwise methylene chloride-insoluble bisphenol salt into the organic layer for reaction with the substituted phthalimide.

U.S. Pat. No. 5,229,482 discloses a phase transfer catalyzed reaction for the preparation of polyethers. Said reaction occurs between at least one alkali metal salt of a dihydroxy-substituted aromatic hydrocarbon and at least one substituted aromatic compound which may be, for example, a bis(substituted phthalimide), a bis(halophenyl) sulfone or a bis(halophenyl) ketone as indicated hereinabove, in the presence of a catalytically active amount of a phase transfer catalyst which is substantially stable at the temperatures employed. There is no disclosure, however, of copolyetherimides containing other types of structural units or a method for their preparation.

SUMMARY OF THE INVENTION

The present invention is based on the discovery of a class of copolyetherimides containing ether sulfone or ether ketone groups, and a method for their preparation by a phase transfer catalyzed method.

In one of its aspects, the invention includes copolyetherimides comprising structural units of the formulas

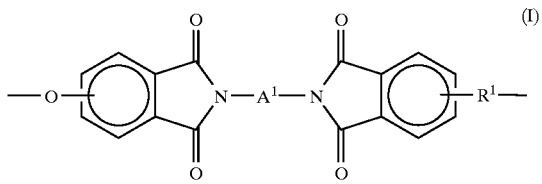

and at least one of the following:

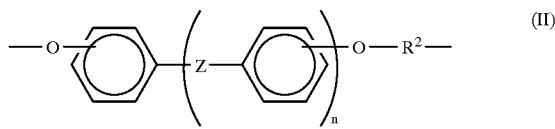

and

wherein:

$A^1$ is a $C_{6-20}$ divalent aromatic hydrocarbon or halogenated hydrocarbon radical, a $C_{2-20}$ alkylene or divalent alicyclic radical, a $C_{2-8}$ bis(alkylene-terminated) polydiorganosiloxane radical or a divalent radical of the formula

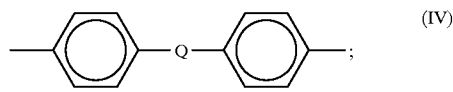

each of $A^2$, $R^1$ and $R^2$ is independently a divalent aromatic radical;

Q is —$C_2H_4$—, —O—, —$C(CF_3)$—, —$C(O)$—, —$SO_2$— or a covalent bond;

Z is —CO— or —$SO_2$—;

n is 1 or 2; and p is 0 or 1.

In another aspect, the invention is a method for preparing a copolyetherimide which comprises contacting, in a solvent and at a temperature in the range of about 125–250° C., (A) at least one alkali metal salt of a dihydroxy-substituted aromatic hydrocarbon having the formula HO—$R^1$—OH with (B) at least one first substituted aromatic compound of the formula

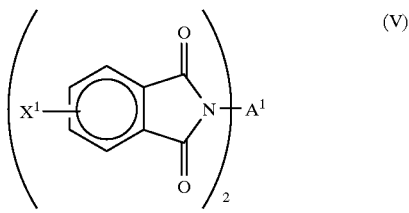

and (C) at least one second substituted aromatic compound of the formula

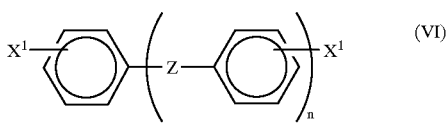 (VI)

or (D) at least one macrocyclic polycarbonate or polyarylate oligomer; wherein each $X^1$ is independently fluoro, chloro, bromo or nitro and $A^1$, $R^1$, Z and n are as previously defined; in the presence of a catalytically active amount of a phase transfer catalyst which is substantially stable at the temperatures employed.

DETAILED DESCRIPTION; PREFERRED EMBODIMENTS

The $A^1$ radical in the copolyetherimides of this invention may be an aromatic hydrocarbon, halogenated aromatic hydrocarbon, alkylene or divalent alicyclic radical as indicated. It may also be a bis(alkylene-terminated) polydiorganosiloxane radical such as that derived from 1,9-diamino-4,4,6,6-tetramethyl-4,6-disila-5-oxanonane, also designated bis(3-aminopropyl)tetramethyldisiloxane, and its equilibration products with cyclic polydialkylsiloxanes such as octamethylcyclotetrasiloxane.

$A^1$ may also be a divalent radical of formula IV, wherein Q is as defined. Most often, $A^1$ is m-phenylene, p-phenylene, alkylated m- or p-phenylene or a mixture thereof.

The copolyetherimides of the invention also comprise structural units of formula II or formula III. In formula II, Z may be a carbonyl group or a sulfone group and n may be 1 or 2. The $R^2$ radicals in formulas I and II is a divalent aromatic radical and preferably a bisphenol-derived radical, especially 2,2-bis(4-phenylene)propane, the radical derived from bisphenol A.

In formula III, $A^2$ is a divalent aromatic radical and p is 0, whereupon the units of formula III are carbonate units, or 1, whereupon they are ester units. When p is 1, $A^2$ is preferably p-phenylene, m-phenylene or a mixture thereof. When p is 0, the preferred $A^2$ radicals often have the formula

 (VII)

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula I are usually in the meta or para positions of $A^3$ and $A^4$ in relation to Y. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2,2,1] bicycloheptyl methylene, ethylene, isopropylidene, neopentylidene, cyclohexyl idene, cyclopentadecylidene, cyclododecylidene and adamantylidene; gem-alkylene (alkylidene) radicals are preferred. For reasons of availability and particular suitability for the purposes of this invention, the preferred radical of formula VII is derived from bisphenol A, in which Y is isopropylidene and $A^3$ and $A^4$ are each p-phenylene.

The method of this invention requires the use of compound A which is an alkali metal, preferably sodium, salt of a dihydroxyaromatic compound such as bisphenol A, said compound hereinafter sometimes designated "bisphenol salt", and compound B having formula V in which $X^1$ may be fluoro, chloro, bromo or nitro in the 3- or 4-position, preferably the 4-position. In most instances, chloro is preferred by reason of the relative availability and effectiveness of the compounds containing it. Among the particularly preferred substituted aromatic compounds of formula V are 1,3- and 1,4-bis[N-(4-chlorophthalimido)]benzene and 4,4'-bis[N-(4-chlorophthalimido)]phenyl ether and the corresponding nitro compound.

Also required is compound C or D. Compound C may be, for example, bis(4-fluorophenyl) sulfone or the corresponding chloro compound, or bis(4-fluorophenyl) ketone or the corresponding chloro compound.

Compound D is at least one macrocyclic polycarbonate or polyarylate oligomer. Illustrative oligomers are disclosed in U.S. Pat. Nos. 4,644,053 and 4,829,144 respectively, the disclosures of which are incorporated by reference herein.

A third material employed according in the method of the invention is a solvent, typically one of low polarity, usually substantially lower than that of the dipolar aprotic solvents previously employed for the preparation of aromatic polyether polymers. Said solvent preferably has a boiling point above about 150° C., in order to facilitate the reaction which requires temperatures in the range of about 125–250° C. Suitable solvents of this type include o-dichlorobenzene, dichlorotoluene, 1,2,4-trichlorobenzene, diphenyl sulfone and anisole. Solvents of similar polarity but lower boiling points, such as chlorobenzene, may be employed at superatmospheric pressures.

An essential feature of the invention is the presence of a phase transfer catalyst which is substantially stable at temperatures in the range of about 125–250° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in U.S. Pat. Nos. 5,081,298, 5,116,975 and 5,229,482. Said patents are incorporated by reference herein. Said guanidinium salts are preferred, with the hexaalkylguanidinium salts being most preferred by reason of their availability and particular suitability.

In a first embodiment of the method of the invention, random copolyimides are prepared by bringing compounds A, B and C into contact in proportions such that the molar ratio of compound A to the total of compounds B and C is at least about 1:1, preferably in the range of about 1.0–1.1:1. For maximum molecular weight, the amounts should be as close as possible to exactly equimolar, but molecular weight control may be achieved by employing one reagent or the other in slight excess. It is also within the scope of the invention to employ monofunctional reagents such as monohydroxyaromatic compounds or monohalo- or nitroaromatic compounds as chain termination agents.

In a second embodiment, compound A is first brought into contact with compound B or C and then with the other of said compounds; i.e., compound C or B respectively. The first step of this 2-step procedure employs a slight excess, typically about 1–3% molar, of one reagent, most often compound A, to provide an intermediate having reactive phenol end groups. Further compound A is then added in combination with an approximately equimolar amount of the other of compounds B and C. A block copolyimide is thus formed.

Reaction temperatures are in the range of about 125–250° C., preferably about 130–225° C. The proportion of phase transfer catalyst employed is generally about 0.5–10 and preferably about 1–8 mole percent based on compound A.

A third embodiment of the method of the invention involves the use of reagent D instead of reagent C. It is normally a two-step reaction similar to that described hereinabove for the preparation of block copolyetherimides, except that macrocyclic polycarbonate or polyarylate oligomers are employed in place of compound C. The proportion of macrocyclic oligomer composition introduced will depend on the molecular weight and block size desired in the product copolyetherimide, since a block copolymer is also produced in this embodiment. Otherwise, reaction conditions are similar to those described hereinabove.

Following completion of the reaction, the copolyetherimide may be isolated by conventional methods. These typically include the steps of washing and precipitation by combination of the polymer solution with a non-solvent for the polymer.

The copolyetherimides of this invention may be used as molding materials, for injection molding and the like. They may also be used as compatibilizers for mixtures of otherwise incompatible polymers.

The invention is illustrated by the following examples. The bisphenol disodium salts employed in the examples, (of 4,4'-dihydroxybiphenyl and bisphenol A) were prepared by the reaction of the bisphenol with an aqueous solution containing a stoichiometric amount of sodium hydroxide, followed by removal of the water by azeotropic distillation with xylene and storage of the anhydrous salt in a drybox. Compound B in each example was 1,3-bis(N-4-chlorophthalimido)benzene (CIPAMI). All molecular weights are weight average, determined by gel permeation chromatography relative to polystyrene.

EXAMPLES 1–6

A series of oven-dried 50-ml 3-necked flasks was employed. Each flask was transferred to a nitrogen dry box and charged with 10.15 mmol of bisphenol disodium salt and 5 mmol each of CIPAMI and compound C. The flasks were capped, transferred to a heated oil bath and fitted with a condenser, nitrogen inlet and mechanical stirrer. Solvent, 25 ml, was added and the mixtures were heated under reflux, with stirring. About 5 ml of solvent was allowed to distill, after which a solution of 0.5 mmol of hexa-n-propylguanidinium chloride in about 1 ml of solvent was added over one minute, whereupon a vigorous exothermic reaction occurred. The reaction mixture was sampled periodically by removing small aliquots which were quenched with acetic acid and diluted with methylene chloride for molecular weight analysis. When a product of high molecular weight had been obtained, the reaction was quenched with acetic acid and the mixture was cooled to ambient temperature, diluted with methylene chloride, washed with aqueous hydrochloric acid solution and several times with water. The methylene chloride solutions were concentrated by evaporation and the products, which were the desired random copolyetherimides, were precipitated into methanol.

The results are given in Table I. The following reactant abbreviations are employed.

PP—4,4'-dihydroxybiphenyl
BPA—bisphenol A
CPS—bis(4-chlorophenyl) sulfone
FBP—4,4'-difluorobenzophenone
FBB—1,4'-bis(4-chlorobenzoyl)benzene
DCB—o-dichlorobenzene.

TABLE 1

| Example | Bisphenol | Compound C | Solvent | Time, min. | Product mol. wt. |
|---------|-----------|------------|---------|------------|------------------|
| 1 | BP | CPS | Anisole | 300 | 42,000 |
| 2 | BP | CPS | DCB | 180 | 50,000 |
| 3 | BPA | CPS | Anisole | 240 | 44,000 |
| 4 | BPA | FBP | Anisole | 75 | 69,000 |
| 5 | BPA | FBB | Anisole | 37 | 66,200 |
| 6 | BPA | FBB | Anisole | 20 | 88,600 |

EXAMPLES 7–8

A series of oven-dried 100-ml 3-necked flasks was employed Each flask was transferred to a nitrogen dry box and charged with 10.20 mmol of bisphenol disodium salt and 10 mmol of CIPAMI. The flasks were capped, transferred to a heated oil bath and fitted with a condenser, nitrogen inlet and mechanical stirrer. o-Dichlorobenzene, 25 ml, was added and the mixtures were heated under reflux, with stirring. About 5 ml of solvent was allowed to distill, after which a solution of 0.5 mmol of hexa-n-propylguanidinium chloride in about 1 ml of solvent was added over one minute, whereupon a vigorous exothermic reaction occurred. After two hours, 10 mmol of compound C was added, followed 5 minutes later by an additional 10 mmol of bisphenol A disodium salt. When products of high molecular weight had been obtained, said products, which were the desired block copolyetherimides, were worked up as in Examples 1–6. The results are given in Table II.

TABLE II

| Example | Compound C | Time, min. | Product mol. wt. |
|---------|------------|------------|------------------|
| 7 | FBP | 3 | 51,000 |
| 8 | FBB | 276 | 43,700 |

EXAMPLE 9

The procedure of Examples 1–6 was repeated, for the CIPAMI a corresponding bis(chlorophthalimide) prepared from "Ethacure 100", an isomeric mixture of diethylmethyl-m-phenylenediamines available from Albemarle Corporation. After 20 minutes, a copolyetherimide having a molecular weight of 54,400 was obtained.

EXAMPLE 10

The procedure of Example 8 was repeated, substituting for the CIPAMI the "Ethacure 100" mixture. After 172 minutes, a copolyetherimide having a molecular weight of 66,200 was obtained.

EXAMPLE 11

A flask similar to that used in Examples 7–8 was charged with 10.20 mmol of bisphenol A disodium salt and 10 mmol of CIPAMI. It was fitted, dried and charged with o-dichlorobenzene and guanidinium salt as in Examples 1–6. After the initial exothermic reaction, there was added 10 mmol (based on carbonate structural units) of a macrocyclic bisphenol A polycarbonate oligomer mixture. After 5 minutes, the molecular weight had reached 140,000 and no further cyclic polycarbonates were detected. The reaction was quenched with acetic acid after 10 minutes and the mixture was cooled and worked up as in Examples 1–6. The product was the desired block copolyetherimidecarbonate.

EXAMPLE 12

The procedure of Example 11 was repeated, substituting for the CIPAMI the "Ethacure 100" mixture. After 138 minutes, a copolyetherimidecarbonate having a molecular weight of 49,300 was obtained.

What is claimed is:

1. A copolyetherimide comprising structural units of the formulas

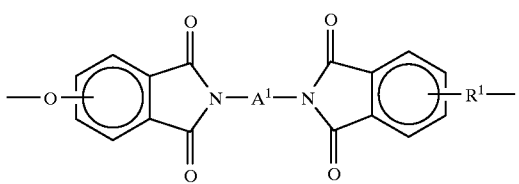

(I)

and at least one of the following:

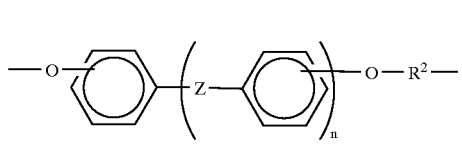

(II)

and

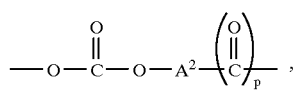

(III)

wherein:

$A^1$ is a $C_{6-20}$ divalent aromatic hydrocarbon or halogenated hydrocarbon radical, a $C_{2-20}$ alkylene or divalent alicyclic radical, a $C_{2-8}$ bis(alkylene-terminated) polydiorganosiloxane radical or a divalent radical of the formula

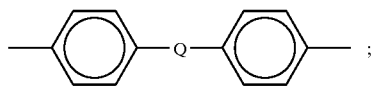

(IV)

each of $A^2$, $R^1$ and $R^2$ is independently a divalent aromatic radical;

Q is —$C_2H_4$—, —O—, —$C(CF_3)$—, —C(O)—, —$SO_2$— or a covalent bond;

Z is —CO— or —$SO_2$—;

n is 1 or 2; and p is 0 or 1.

2. A copolyetherimide according to claim 1 wherein the units of formula I have the formula

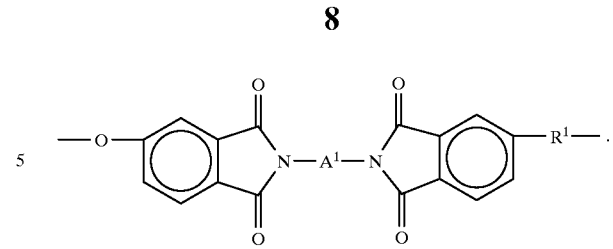

3. A copolyetherimide according to claim 2 wherein A' is m-phenylene, p-phenylene, alkylated m- or p-phenylene or a mixture thereof.

4. A copolyetherimide according to claim 1 comprising units of formula II.

5. A copolyetherimide according to claim 4 wherein Z is —CO—.

6. A copolyetherimide according to claim 4 wherein Z is —SO2—.

7. A copolyetherimide according to claim 1 wherein each of $R^1$ and $R^2$ is 2,2-bis(4-phenylene)propane.

8. A copolyetherimide according to claim 1 comprising units of formula III.

9. A copolyetherimide according to claim 8 wherein $A^2$ is 2,2-bis(4-phenylene)propane.

10. A copolyetherimide according to claim 8 wherein p is 0.

11. A copolyetherimide according to claim 1 which is a random copolymer.

12. A copolyetherimide according to claim 1 which is a block copolymer.

13. A method for preparing a copolyetherimide which comprises contacting, in a solvent and at a temperature in the range of about 125–250 C., (A) at least one alkali metal salt of a dihydroxy-substituted aromatic hydrocarbon having the formula HO—$R^1$—OH with (B) at least one first substituted aromatic compound of the formula

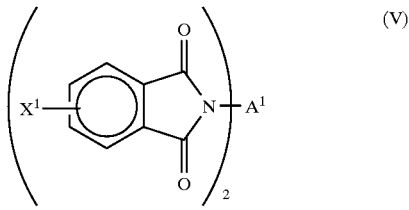

(V)

and (C) at least one second substituted aromatic compound of the formula

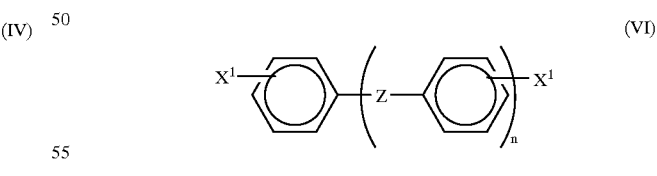

(VI)

or (D) at least one macrocyclic polycarbonate or polyarylate oligomer; wherein each $X^1$ is independently fluoro, chloro, bromo or nitro; in the presence of a catalytically active amount of a phase transfer catalyst which is substantially stable at the temperatures employed.

14. A method according to claim 13 wherein the phase transfer catalyst is a quaternary phosphonium salt, an N-alkyl-4-dialkylaminopyridinium salt or a hexaalkylguanidinium salt.

15. A method according to claim 14 wherein the phase transfer catalyst is a hexaalkylguanidinium halide.

16. A method according to claim 13 wherein $A^1$ is m-phenylene, p-phenylene, alkylated m- or p-phenylene or a mixture thereof.

17. A method according to claim 13 wherein compound C is employed.

18. A method according to claim 17 wherein compounds A, B and C are brought into contact in proportions such that the molar ratio of compound A to the total of compounds B and C is at least about 1:1, thereby producing a random copolymer.

19. A method according to claim 17 wherein component A is first brought into contact with compound B or C and then with the other of said compounds B and C, thereby producing a block copolymer.

20. A method according to claim 13 wherein compound D is employed.

21. A method according to claim 20 wherein compound D is a macrocyclic polycarbonate oligomer mixture.

* * * * *